Oct. 18, 1938.                W. G. ROWE                2,133,572
                         AUTOMOBILE SIGNAL SWITCH
                         Filed July 22, 1937              2 Sheets-Sheet 1

Inventor
William G. Rowe

By Clarence A. O'Brien
   Hyman Berman
           Attorneys

Oct. 18, 1938.  W. G. ROWE  2,133,572
AUTOMOBILE SIGNAL SWITCH
Filed July 22, 1937  2 Sheets-Sheet 2
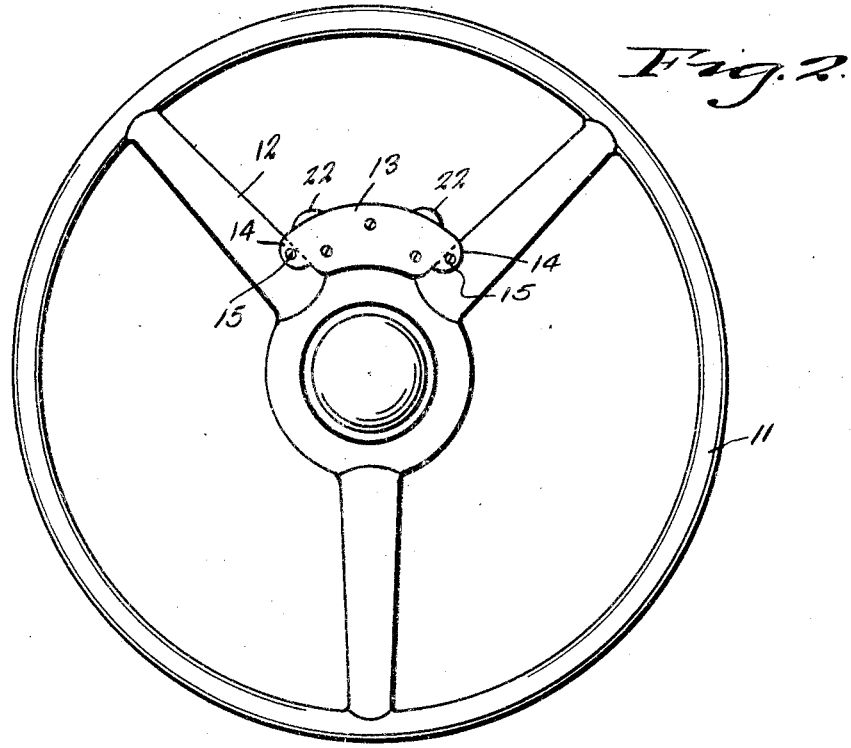
Fig. 2.
Fig. 3.
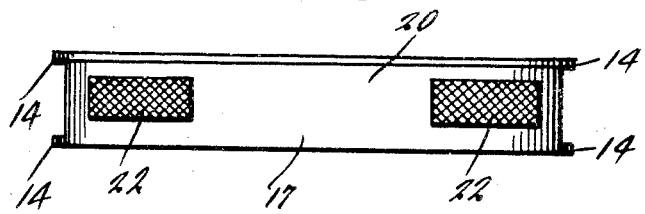
Fig. 5.
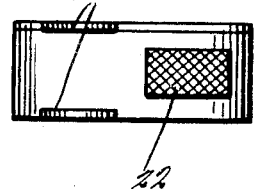
Fig. 4
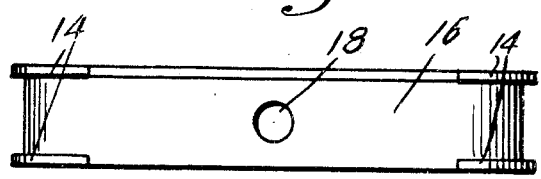
Inventor
William G. Rowe
By Clarence A. O'Brien
Hyman Berman
Attorneys Patented Oct. 18, 1938

2,133,572

UNITED STATES PATENT OFFICE 2,133,572

AUTOMOBILE SIGNAL SWITCH

William G. Rowe, Milwaukee, Wis.

Application July 22, 1937, Serial No. 155,127

1 Claim. (Cl. 200—59)

This invention appertains to new and useful improvements in electrical signaling switches and more particularly to a direction signal switch for automobiles.

The principal object of the present invention is to provide a signal means whereby the driver can indicate to pedestrians and other motorists the direction in which he intends to travel.

Another important object of the invention is to provide a direction signal including a switch which can be conveniently mounted on the usual automobile steering wheel.

These and various other important objects and advantages of the invention will become apparent to the reader of the following specification.

In the drawings:—

Figure 2 is a plan view of the steering wheel equipped with the switch.

Figure 3 is a top plan view of the switch.

Figure 4 is a bottom plan view of the switch.

Figure 5 is an end elevational view of the signal.

Figure 1:
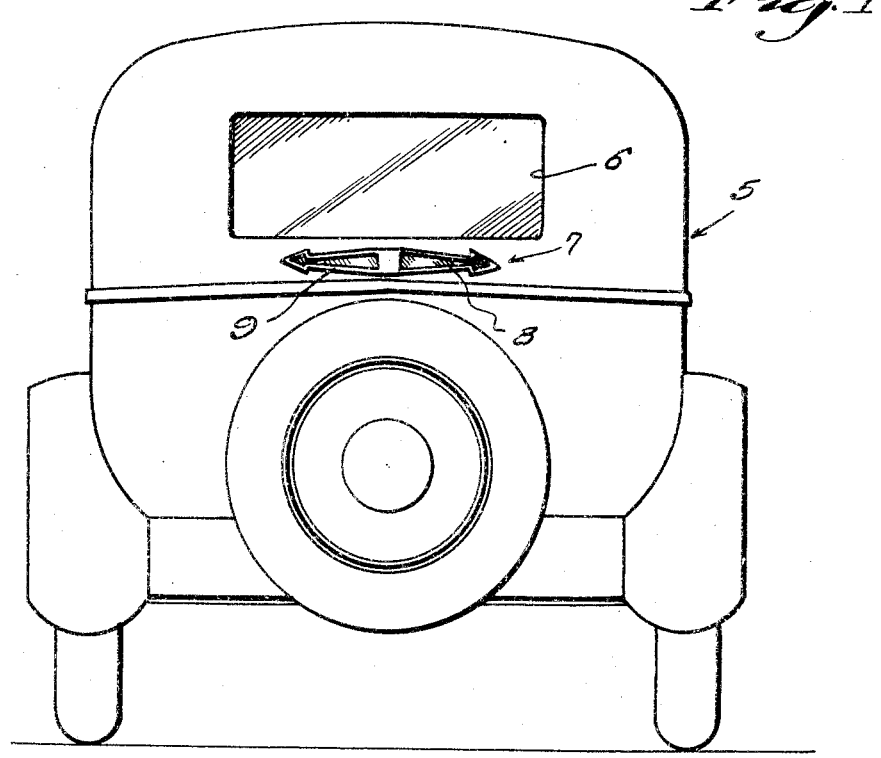
Figure 1 represents a rear elevational view of an automobile showing the signal box in position for use.
Figure 6:
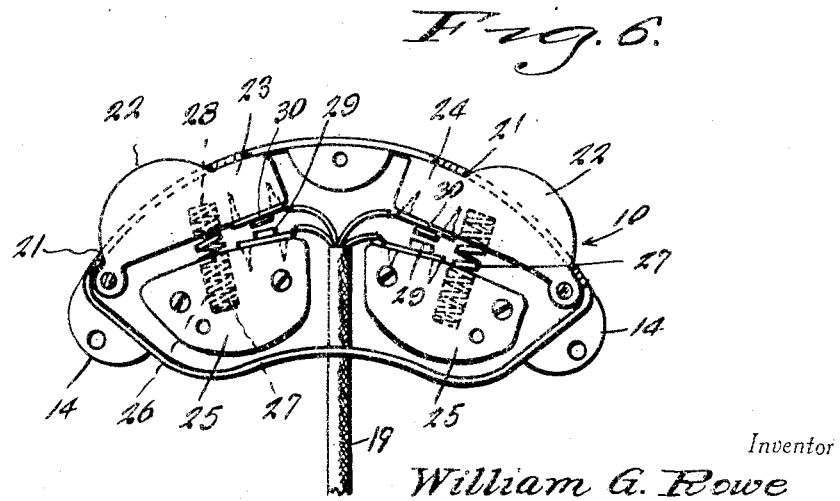
Figure 6 is a sectional view through the casing showing in elevation the details of the switch.

Referring to the drawings wherein like numerals designate like parts, it can be seen in Figure 1, that numeral 5 denotes an automobile body, just under the rear window 6 of which is mounted the signal means generally referred to by numeral 7. This signal means consists of right and left pointing arrow-shaped lamp boxes 8—9, respectively, adapted to be controlled by the switch means generally referred to by numeral 10. This switch means is of such construction as to be conveniently mounted on the usual steering wheel 11 between a pair of the spokes 12 thereof.

The switch consists of the casing made up of the side walls 13, one of which is removable. These side walls are arcuate in longitudinal extent and each has an ear-like extension 14 apertured to receive a screw or like securing member 15 which is driven into the corresponding spoke 12 of the steering wheel.

The case is also provided with a bottom wall 16 and a top wall 17. The bottom wall 16 is provided with the opening 18 through which the conductor cord 19 is trained from the signal means 7 to the contacting means in the signal.

The top wall 20 of the signal switch is arcuate in shape and provided with a pair of openings 21 therein through which the finger engageable knobs 22—22 of the contactor members 23—24 respectively, protrude.

Stationarily mounted in the case of the switch are the blocks 25—25 each provided with a recess 26 therein for receiving one end portion of a coiled compressible spring 27, the upper end of which upwardly seats in a recess 28 of the adjacent contactor 23.

The blocks 25—25 each supports a contact member 29 while the contactors 23 in turn carry the contacts 30 which are engageable with the contacts 29.

Thus when one of the contactors 23 is forced downwardly its contact 30 will engage the corresponding contact 29 and result in the closing of the corresponding circuit including the lamp of the lamp box 9 or the lamp of the lamp box 8.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

A switch structure of the character described comprising an arcuate-shaped casing, a pair of contactors mounted in the casing, a pair of stationary contacts in the casing with which the contactors are engageable, said casing provided with openings in its top, and knobs rising from the said contactors and protruding through the said openings, stationary blocks mounted in the casing and carrying said stationary contacts, and spring means between the stationary blocks and the contactors rising the knob portions of the contactors through the corresponding opening, the opposed faces of the contactors and blocks being formed with recesses receiving the end portions of the corresponding springs.

WILLIAM G. ROWE.